(12) United States Patent
Parrett et al.

(10) Patent No.: US 9,545,820 B2
(45) Date of Patent: Jan. 17, 2017

(54) WHEEL WITH ALUMINUM FOAM FOR TIRE CAVITY NOISE SUPPRESSION

(71) Applicant: GM GLOBAL TECHNOLOGY OPERATIONS LLC, Detroit, MI (US)

(72) Inventors: Alan V. Parrett, Milford, MI (US); Christopher A. Stirlen, Milford, MI (US); Jinshuo Zhu, Novi, MI (US); Chong Wang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 60 days.

(21) Appl. No.: 14/529,672

(22) Filed: Oct. 31, 2014

(65) Prior Publication Data

US 2016/0121648 A1    May 5, 2016

(51) Int. Cl.
*B60B 21/12* (2006.01)
*B60B 3/10* (2006.01)
*B60B 19/06* (2006.01)
*B60B 19/08* (2006.01)

(52) U.S. Cl.
CPC .............. *B60B 21/12* (2013.01); *B60B 3/10* (2013.01); *B60B 19/06* (2013.01); *B60B 19/08* (2013.01); *B60B 2310/302* (2013.01); *B60B 2310/306* (2013.01); *B60B 2310/318* (2013.01); *B60B 2360/104* (2013.01); *B60B 2360/147* (2013.01); *B60B 2360/149* (2013.01); *B60B 2900/133* (2013.01)

(58) Field of Classification Search
CPC ............................................ Y10T 29/49506
See application file for complete search history.

(56) References Cited

U.S. PATENT DOCUMENTS

| 4,252,378 A | 2/1981 | DeBolt et al. |
| 8,783,414 B2 * | 7/2014 | Gaiser .................. F01N 13/102 181/252 |
| 2004/0066083 A1 * | 4/2004 | Tsihlas .................. B60C 19/002 301/6.91 |

FOREIGN PATENT DOCUMENTS

| DE | 69838176 T2 | 4/2008 |
| DE | 102010025642 A1 | 3/2011 |
| EP | 1055527 A1 | 11/2000 |
| WO | 2013068763 A1 | 5/2013 |

* cited by examiner

*Primary Examiner* — John Walters
*Assistant Examiner* — James Triggs
(74) *Attorney, Agent, or Firm* — Quinn Law Group

(57) ABSTRACT

A wheel assembly includes a wheel including a spoke portion radially supporting a rim portion about a central axis, wherein the rim portion presents a radial outer surface relative to the central axis. A tire is mounted to the wheel and cooperates with the wheel to define a tire cavity between the radial outer surface of the rim portion and the tire. A foamed aluminum portion is supported by the wheel, and includes a plurality of pores arranged to define an open-cell foam. The plurality of pores of the foamed aluminum portion is disposed in fluid communication with the tire cavity to absorb noise from within the tire cavity. The foamed aluminum portion may be integrally cast with the wheel, or otherwise affixed to the wheel.

14 Claims, 7 Drawing Sheets

WHEEL WITH ALUMINUM FOAM FOR TIRE CAVITY NOISE SUPPRESSION

TECHNICAL FIELD

The disclosure generally relates to a wheel assembly, and a method of manufacturing the wheel assembly.

BACKGROUND

Vehicles are subject to road noise caused by acoustic resonances associated with a wheel assembly of the vehicle. The wheel assembly includes a wheel with a tire mounted thereon. The wheel includes a spoke portion that radially supports a rim portion about a central axis. Road noise resonates within a tire cavity of the wheel assembly, which is defined between the rim portion of the wheel and tire.

SUMMARY

A wheel assembly is provided. The wheel assembly includes a wheel that is concentrically disposed about a central axis. The wheel presents a radial outer surface relative to the central axis. A foamed aluminum portion is supported by the wheel. The foamed aluminum portion includes a plurality of pores arranged to define an open-cell foam. The plurality of pores of the foamed aluminum portion is disposed in fluid communication with the radial outer surface of the wheel to absorb noise from within a tire cavity of the wheel assembly.

A method of manufacturing a wheel assembly is also provided. The method includes casting a wheel to include a spoke portion that radially supports a rim portion about a central axis, and casting a foamed aluminum portion to define a plurality of pores having a pore size between 0.1 mm and 4.0 mm. The foamed aluminum portion is attached to the wheel such that the plurality of pores is disposed in fluid communication with an outer radial surface of the rim portion.

Accordingly, the foamed aluminum portion is operable to attenuate or suppress road noise that resonates within the tire cavity. The foamed aluminum portion provides small pore sizes, which make it difficult for noise to communicate therethrough, thereby absorbing noise from the tire cavity. Additionally the foamed aluminum portion may be integrally cast with other portions of the wheel assembly, such as the spoke portion or the rim portion of the wheel. Furthermore, the foamed aluminum portion is strong enough to form a structural, weight bearing component of the wheel assembly, and will last the life time of the wheel.

The above features and advantages and other features and advantages of the present teachings are readily apparent from the following detailed description of the best modes for carrying out the teachings when taken in connection with the accompanying drawings.

DETAILED DESCRIPTION

Figure 1:
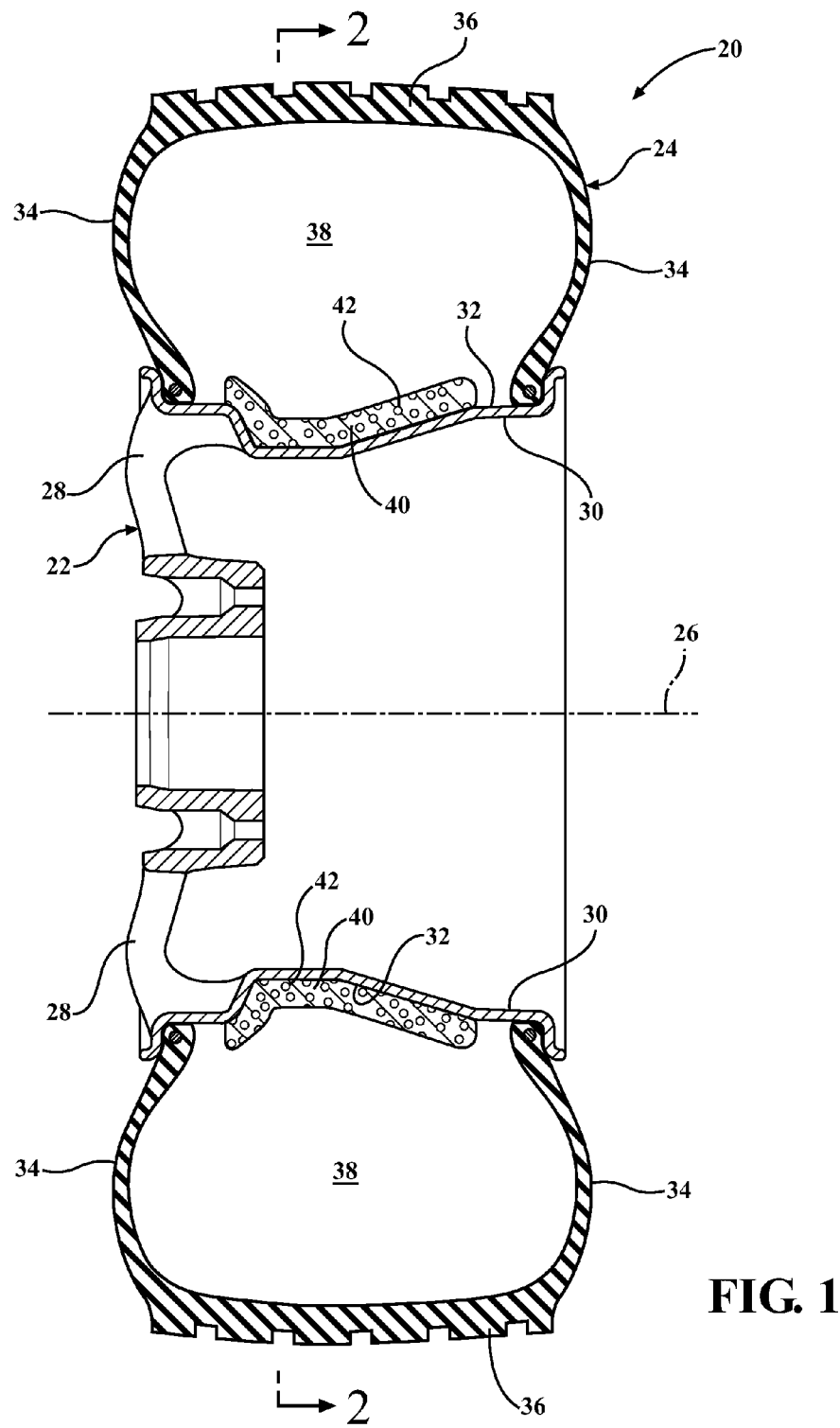
FIG. 1 is a schematic cross sectional view of a first alternative embodiment of a wheel assembly parallel to a central axis.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a wheel assembly is generally shown at 20. The wheel assembly 20 is for a vehicle, such as but not limited to a car or truck, and includes a wheel 22 having a pneumatic tire 24 mounted thereon.

The wheel 22 is concentrically disposed about a central axis 26. Typically, the wheel 22 is mounted to a hub (not shown), which rotates about the central axis 26. The wheel 22 may include a spoke portion 28 and a rim portion 30. The spoke portion 28 radially supports the rim portion 30 about the central axis 26. The wheel 22, and more specifically the rim portion 30 of the wheel 22, presents a radial outer surface 32 relative to the central axis 26. The radial outer surface 32 extends circumferentially around an exterior surface of the rim portion 30, relative to and about the central axis 26. Accordingly, the radial outer surface 32 may be defined as the exterior or outer side of the rim portion 30 of the wheel 22. The spoke portion 28 may be configured in any desirable, aesthetically pleasing configuration, and may be generally configured as a substantially solid disc, or as a plurality of spokes radiating outward from the central axis 26.

The tire 24 is mounted to the wheel 22 in a manner known to those skilled in the art. The tire 24 includes two opposing side walls 34 and an end wall 36. The end wall 36 is radially spaced outward of the radial outer surface 32 of the rim portion 30, relative to the central axis 26. The side walls 34 of the tire 24 extend from the end wall 36 to the rim portion 30, and are attached in interlocking engagement with the rim portion 30 of the wheel 22 as is known. The tire 24 and the wheel 22, particularly the rim portion 30 of the wheel 22, cooperate to define a tire cavity 38 between the radial outer surface 32 of the wheel 22 and the tire 24.

Figure 6:
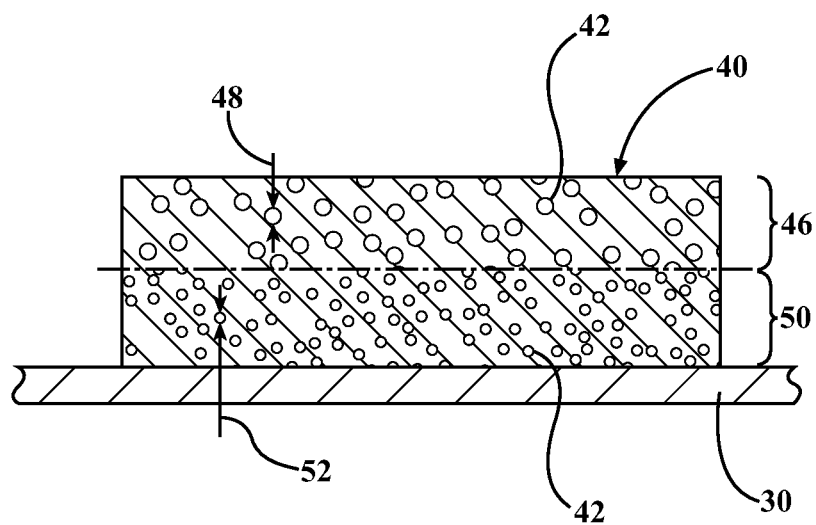
FIG. 6 is a schematic cross section of a foamed aluminum portion of the wheel assembly.

The wheel assembly 20 further includes a foamed aluminum portion 40. The foamed aluminum portion 40 is supported by the wheel 22. The foamed aluminum portion 40 is a metal foam manufactured from aluminum, which defines a plurality of pores 42, best shown in FIG. 6. As used herein, foamed aluminum is a metal foam made from aluminum or an aluminum alloy, which includes a large volume fraction of gas-filled pores 42 or cells. The pores 42 are disposed in fluid communication with each other to form an interconnected network, and define an open-cell foam. The foamed aluminum includes a very high porosity.

The plurality of pores 42 of the foamed aluminum portion 40 are disposed in fluid communication with the radial outer surface 32 of the wheel 22. More specifically, the plurality of pores 42 are disposed in fluid communication with the tire cavity 38 defined between the tire 24 and the radial outer surface 32 of the rim portion 30 of the wheel 22. As used herein, the term "fluid communication" is defined as capable allowing a gas to pass between. Accordingly, because the plurality of pores 42 are in fluid communication with the tire cavity, gases from the tire cavity may pass to and through the plurality of pores. Having the plurality of pores 42 of the foamed aluminum portion 40 disposed in fluid communication with the tire cavity 38 allows sound waves, which may be generated during operation of the vehicle, to communicate between the tire cavity 38 and the plurality of pores 42 of the foamed aluminum portion 40. The plurality of pores 42 create a tortuous network or path through which gases may pass. The plurality of pores 42 are only shown schematically in the Figures. It should be appreciated that the plurality of pores exist in three dimensions, such that the plurality of pores 42 may be connected in fluid communication with other pores either above or below the page as viewed in the Figures. As such, it should be appreciated that the plurality of pores are connected to each other in fluid communication to define the tortuous network or path. The sound waves also may pass through this tortuous network formed by the plurality of pores 42, thereby dissipating or absorbing the sound. Accordingly, the foamed aluminum portion 40 is a sound dampener for the wheel assembly 20.

Each of the plurality of pores 42 includes a pore 42 size. The shape of each of the plurality of pores 42 may be uniform, such as but not limited to a substantially spherical shape, or may vary between the different pores 42. As used herein, the pore 42 size may be defined as the maximum distance across the void defined by each pore 42. For example, if the pore 42 defines a spherical shape, then the pore 42 size may be defined as the diameter of the sphere. However, because the pores 42 may include a non-standard geometric shape, e.g., a non-spherical shape, it should be appreciated that pores 42 may not define a diameter as generally understood. Accordingly, the pore 42 size is defined herein as the maximum distance across the void defined by the specific pore 42. Preferably, the pore 42 size of any of the plurality of pores 42 is between 0.1 mm and 4.0 mm. However, it should be appreciated that the pore 42 size may differ from exemplary range provided herein.

As noted above, the foamed aluminum portion 40 includes a porosity, i.e., a pore 42 density. The used herein, the pore 42 density is the number of pores 42 per unit volume of the foamed aluminum portion 40. The pore 42 density may be uniformed across a cross section of the foamed aluminum portion 40. Alternatively, the pore 42 density may vary across a cross section of the foamed aluminum portion 40 to substantially define a plurality cross sectional regions within the cross section of the foamed aluminum portion 40. Accordingly, each cross sectional region of the foamed aluminum portion 40 may include a different pore 42 density than any adjacent cross sectional region. For example, referring to FIG. 6, the foamed aluminum portion 40 may define a first region 46 having pores 42 of a larger, first pore size 48, and a second region 50 having a pores 42 of a smaller, second pore size 52. Because the pores 42 of the first region 46 include a larger pore 42 size, the first region 46 may not include as many pores 42 as the second region 50. As such, the second region 50 may include a higher pore 42 density than the first region 46. The size, thickness, pore 42 density, and pore 42 size of the different regions of the foamed aluminum portion 40 may be configured to optimize the sound absorption ability of the foamed aluminum portion 40. While FIG. 6 only shows 2 different regions, it should be appreciated that the foamed aluminum portion 40 may include any number of regions.

The foamed aluminum portion 40 may be integrally cast with the wheel 22, i.e., one of the rim portion 30 or the spoke portion 28. As used herein, integrally cast is defined as cast at the same time from the same material in a single process. Alternatively, the foamed aluminum portion 40 may be attached to the wheel 22 in some other manner. For example, the foamed aluminum portion 40 may be attached to either the rim portion 30 or the wheel 22 portion by welding the foamed aluminum portion 40 to the wheel 22, gluing the foamed aluminum portion 40 to the wheel 22, clamping the foamed aluminum portion 40 to the wheel 22, or fastening the foamed aluminum portion 40 to the wheel 22 with fasteners, such as bolts or screws.

Figure 2:
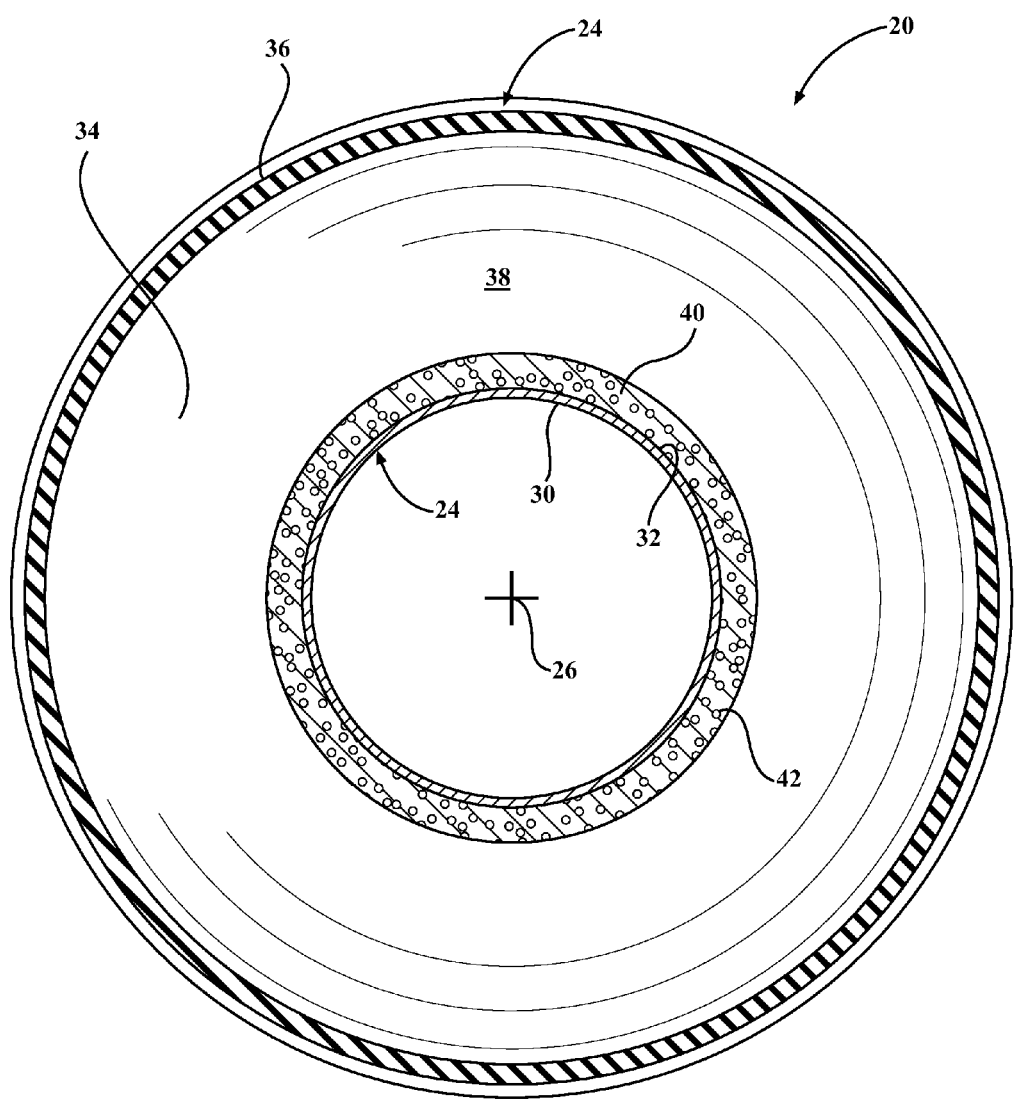
FIG. 2 is a schematic cross sectional view of the first alternative embodiment of the wheel assembly shown in FIG. 1 perpendicular to the central axis.
Figure 3:
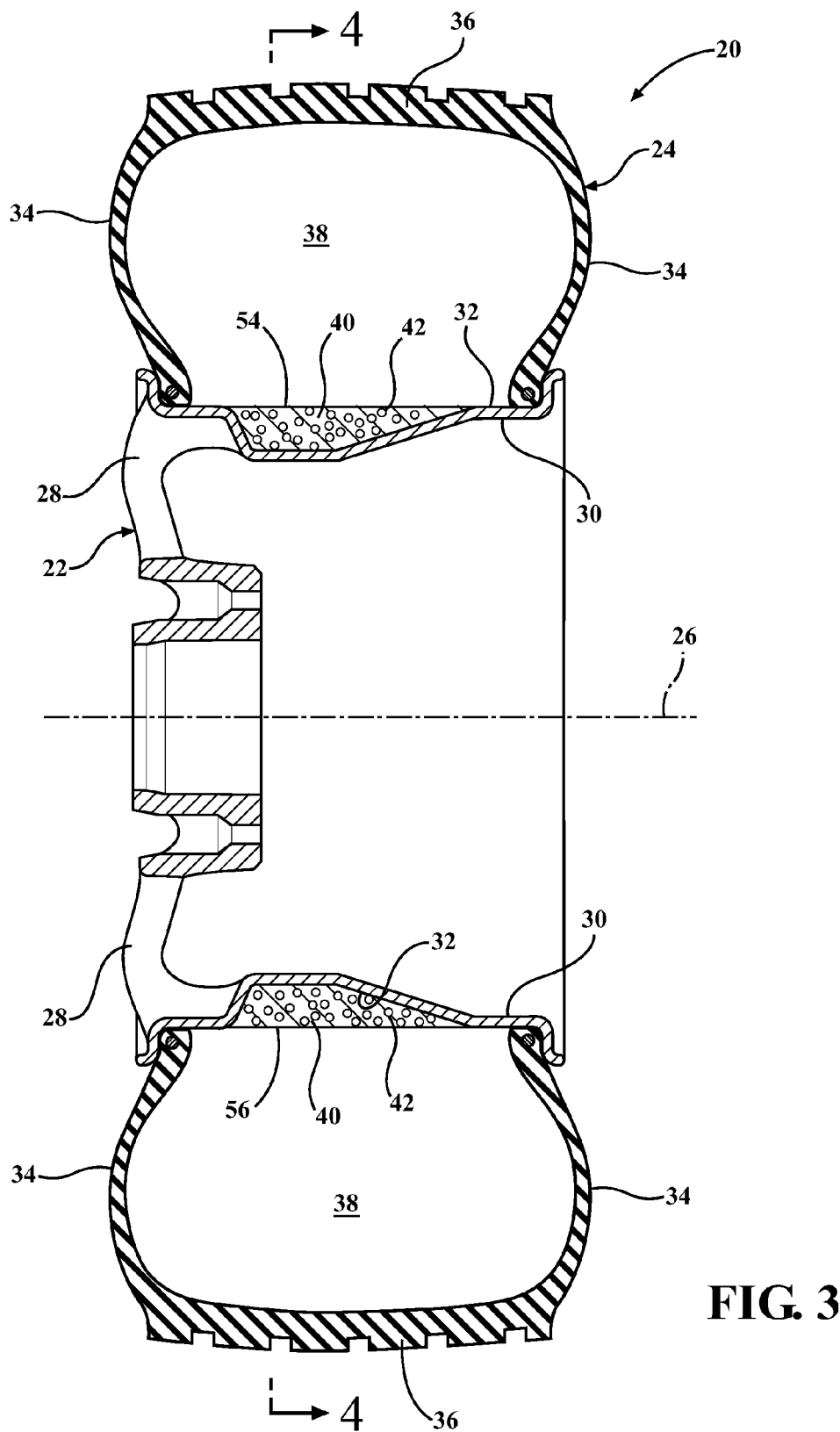
FIG. 3 is a schematic cross sectional view of a second alternative embodiment of the wheel assembly parallel to the central axis.
Figure 4:
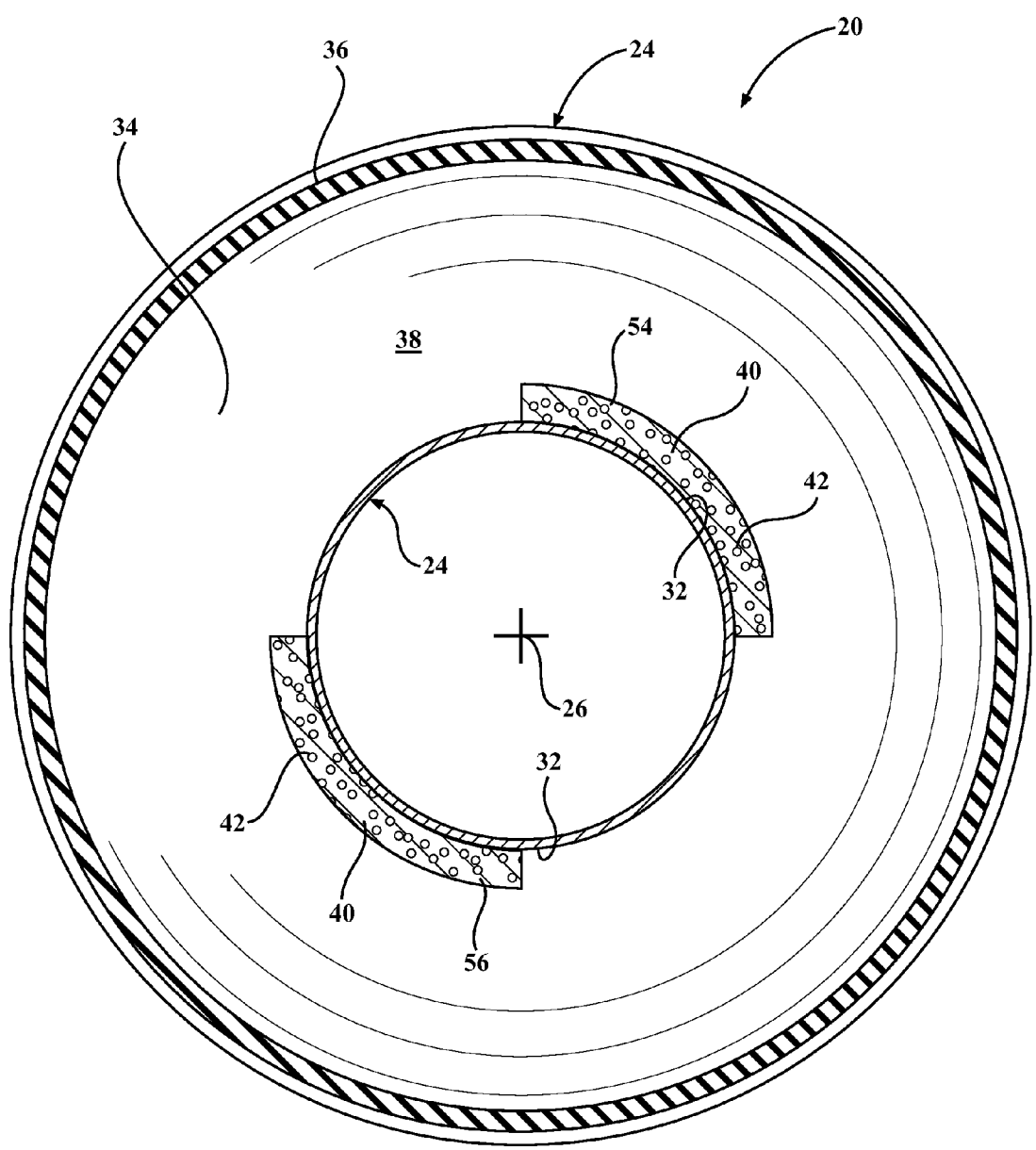
FIG. 4 is a schematic cross sectional view of the second alternative embodiment of the wheel assembly shown in FIG. 3 perpendicular to the central axis.

The foamed aluminum portion 40 may be configured in many different ways. Referring to FIGS. 1 and 2, the foamed aluminum portion 40 is shown attached to the radial outer surface 32 of the rim portion 30, and extending 360° around the central axis 26. However, the foamed aluminum portion 40 does not need to extend completely around the outer periphery of the wheel 22. Rather, the foamed aluminum portion 40 may include a plurality of segments distributed around the central axis 26 in a rotationally balanced configuration. For example, referring FIGS. 3 and 4, the foamed aluminum portion 40 includes a first segment 54 and a second segment 56, positioned on diametrically opposed sides of the rim portion 30, across the central axis 26. The first segment 54 and the second segment 56 of the foamed aluminum portion 40 are shown attached to the outer radial surface of the rim portion 30 of the wheel 22. While FIGS. 3 and 4 show only the first segment 54 and the second segment 56, it should be appreciated that the foamed aluminum portion 40 may include any number of segments.

Figure 5:
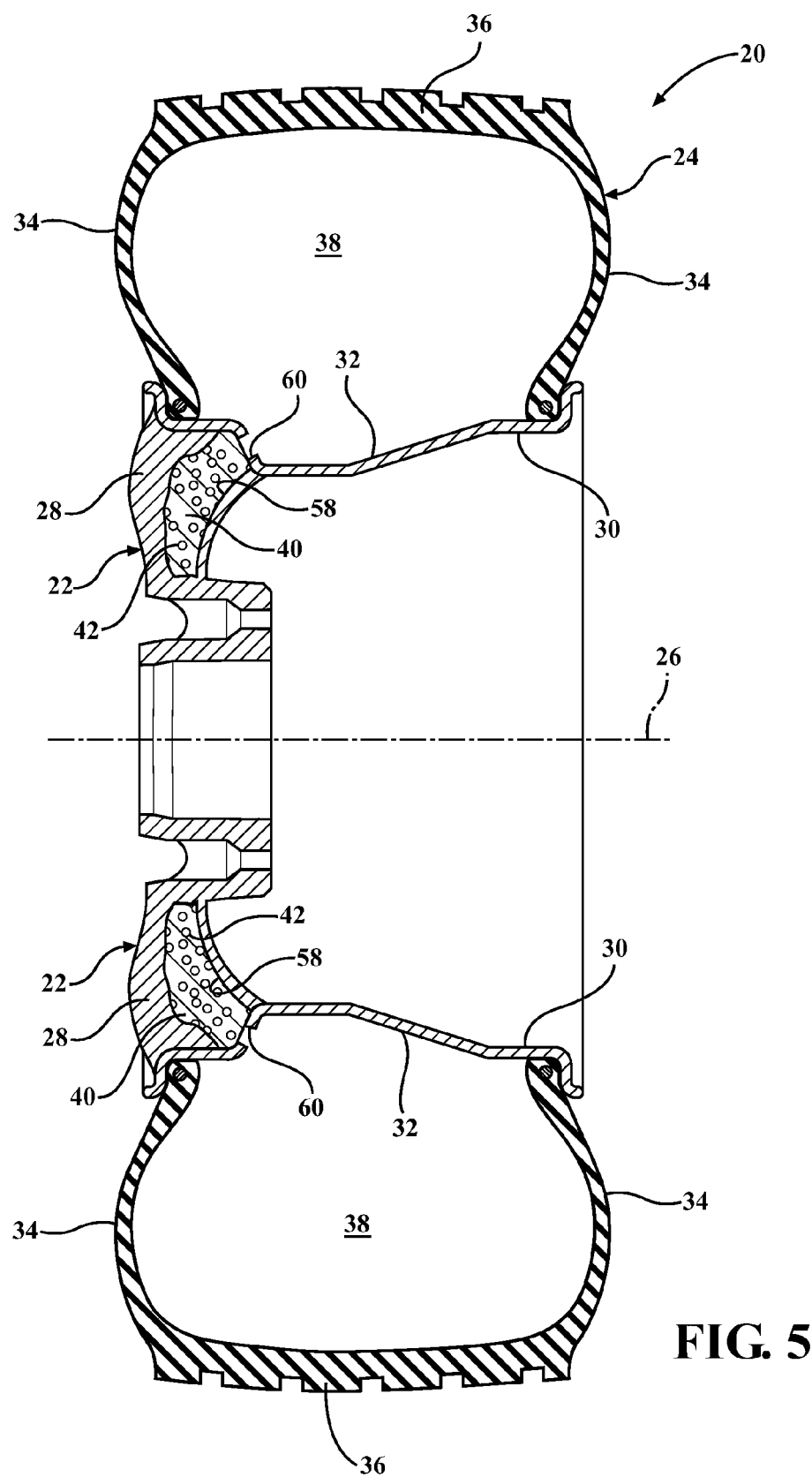
FIG. 5 is a schematic cross sectional view of a third alternative embodiment of the wheel assembly parallel to the central axis.
Figure 7:
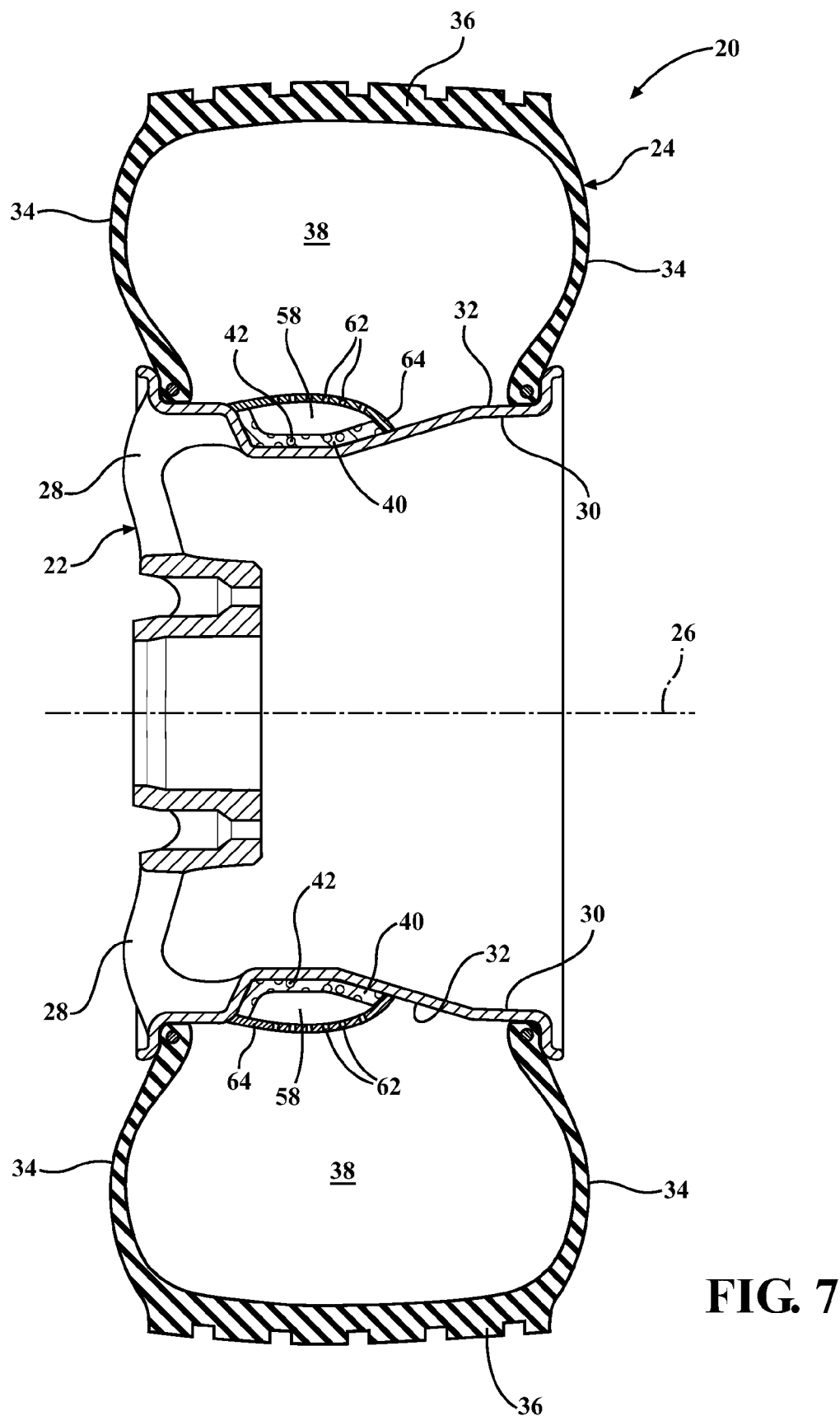
FIG. 7 is a schematic cross sectional view of a fourth alternative embodiment of the wheel assembly parallel to the central axis.

As noted above, the foamed aluminum portion 40 may alternatively be supported by the spoke portion 28 of the wheel 22. Referring to FIG. 5, the wheel 22 defines a cavity 58, with the foamed aluminum portion 40 disposed within the cavity 58. More specifically, the spoke portion 28 of the wheel 22 defines the cavity 58. While FIG. 5 only shows a single cavity 58, it should be appreciated that the wheel 22 may define multiple cavities spaced about the central axis 26 in a rotationally balanced configuration. The foamed aluminum portion 40 may be poured or cast into the cavity 58, or may manufactured at the same time as the spoke portion 28. While FIG. 5 shows the foamed aluminum portion 40 disposed within the cavity 58 defined by the spoke portion 28 of the wheel 22, it should be appreciated that the spoke portion 28 need not define the cavity 58. Rather, the rim portion 30 may alternatively define the cavity 58. For example, referring to FIG. 7. A cavity wall 64 contacting the tire cavity may include micro perforated holes 62 of having sizes between 0.1 mm and 4.0 mm to dissipate the tire cavity resonant fluid energy. The cavity 58 is defined between the cavity wall 64 and the rim portion 30, with the foamed aluminum portion 40 disposed within the cavity 58. It should be appreciated that the foamed aluminum portion 40 does not need to completely fill the cavity 58. Additionally, the cavity wall 64 may also be made from an aluminum foam.

In order to maintain fluid communication between the tire cavity 38 and the pores 42 of the foamed aluminum portion 40, the rim portion 30 may define an aperture 60 extending between and connecting in fluid communication the cavity 58 and the radial outer surface 32 of the wheel 22, i.e., the tire cavity 38. The aperture 60 allows sound waves from the tire cavity 38 to travel into the pores 42 of the foamed aluminum portion 40 through the tortuous network or path defined by the plurality of pores. The aperture 60 may be sized to maximize the sound absorption capabilities of the foamed aluminum, to specifically dampen noise within a specific frequency range. Additionally, the wheel 22 may define multiple apertures 60 for each cavity 58.

The wheel assembly 20 may be manufactured by casting the wheel 22. Specifically, the wheel 22 is cast to include the spoke portion 28 and the rim portion 30. Preferably, the wheel 22 is cast from aluminum or an aluminum alloy. However, it should be appreciated that the wheel 22 may be cast from some other metal. The wheel 22 may be cast using any suitable casting process known to those skilled in the art. If the wheel 22 is to define a cavity 58, such as shown in FIG. 5, then it should be appreciated that casting the wheel 22 includes casting the wheel 22 to define the cavity 58 in one or both of the spoke portion 28 and the rim portion 30.

The foamed aluminum portion 40 is also cast. The foamed aluminum portion 40 is cast to define the plurality of pores 42, with each of the pores 42 having a pore 42 size between 0.1 mm and 4.0 mm. If the foamed aluminum portion 40 is to be disposed within the cavity 58 of the wheel 22, then it should be appreciated that casting the foamed aluminum portion 40 includes as casting the foamed aluminum portion 40 into the cavity 58 defined by the wheel 22. Furthermore, the foamed aluminum portion 40 may be cast to include the plurality of different cross sectional regions, with each of the plurality of cross sectional regions having a different pore 42 density.

The foamed aluminum portion 40 is attached to the wheel 22 such that the plurality of pores 42 are disposed in fluid communication with an outer radial surface of the rim portion 30 relative to the central axis 26. Attaching the foamed aluminum portion 40 to the wheel 22 may include integrally casting the wheel 22 and the foamed aluminum portion 40 at the same time from the same material, such as but not limited to aluminum. Alternatively, attaching the foamed aluminum portion 40 to the wheel 22 may include one of welding the foamed aluminum portion 40 to the wheel 22, gluing the foamed aluminum portion 40 to the wheel 22, clamping the foamed aluminum portion 40 to the wheel 22, or fastening the foamed aluminum portion 40 to the wheel 22. Once the foamed aluminum portion 40 is attached to the wheel 22, the tire 24 may be mounted onto the wheel 22 as is known by those skilled in the art.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A wheel assembly comprising:
    a wheel concentrically disposed about a central axis and presenting a radial outer surface relative to the central axis; and
    a foamed aluminum portion supported by the wheel, and including a plurality of pores arranged to define an open-cell foam;
    wherein the plurality of pores of the foamed aluminum portion are disposed in fluid communication with the radial outer surface of the wheel.

2. The wheel assembly set forth in claim 1 further comprising a tire mounted to the wheel and cooperating with the wheel to define a tire cavity between the radial outer surface of the wheel and the tire, with the plurality of pores disposed in fluid communication with the tire cavity.

3. The wheel assembly set forth in claim 1 wherein the wheel includes a spoke portion radially supporting a rim portion about the central axis.

4. The wheel assembly set forth in claim 3 wherein the foamed aluminum portion is integrally cast with one of the rim portion or the spoke portion.

5. The wheel assembly set forth in claim 3 wherein the wheel defines a cavity, with the foamed aluminum portion disposed within the cavity.

6. The wheel assembly set forth in claim 5 wherein the rim portion defines an aperture extending between and connecting in fluid communication the cavity and the radial outer surface of the wheel.

7. The wheel assembly set forth in claim 5 wherein the spoke portion defines the cavity.

8. The wheel assembly set forth in claim 1 wherein each of the plurality of pores includes a pore size between 0.1 mm and 4.0 mm.

9. The wheel assembly set forth in claim 1 wherein the foamed aluminum portion includes a pore density that varies across a cross section of the foamed aluminum portion to substantially define a plurality cross sectional regions within the cross section of the foamed aluminum portion, with each cross sectional region including a different pore density than any adjacent cross sectional regions.

10. The wheel assembly set forth in claim 1 wherein the foamed aluminum portion extends 360° around the central axis.

11. The wheel assembly set forth in claim 1 wherein the foamed aluminum portion includes a plurality of different segments positioned about the central axis in a rotationally balanced configuration.

12. A wheel assembly comprising:
    a wheel concentrically disposed about a central axis, and including a spoke portion radially supporting a rim portion about a central axis, wherein the rim portion presents a radial outer surface relative to the central axis;
    a tire mounted to the wheel and cooperating with the wheel to define a tire cavity between the radial outer surface of the rim portion and the tire;
    a foamed aluminum portion supported by the wheel, and including a plurality of pores arranged to define an open-cell foam;
    wherein the plurality of pores of the foamed aluminum portion are disposed in fluid communication with the tire cavity.

13. The wheel assembly set forth in claim 12 wherein the foamed aluminum portion includes a pore density that varies across a cross section of the foamed aluminum portion to substantially define a plurality cross sectional regions within the cross section of the foamed aluminum portion, with each cross sectional region including a different pore density than any adjacent cross sectional regions.

14. The wheel assembly set forth in claim 12 wherein the wheel defines a cavity, with the foamed aluminum portion disposed within the cavity.

* * * * *